(12) United States Patent
Wilber

(10) Patent No.: US 7,829,005 B2
(45) Date of Patent: Nov. 9, 2010

(54) METHOD OF DE-MOLDING A PLURALITY OF GOLF BALLS OR GOLF BALL PRECURSOR PRODUCTS FROM INJECTION MOLD ASSEMBLY

(75) Inventor: Donn A. Wilber, Escondido, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 12/564,798

(22) Filed: Sep. 22, 2009

(65) Prior Publication Data

US 2010/0007049 A1    Jan. 14, 2010

Related U.S. Application Data

(60) Continuation of application No. 12/132,055, filed on Jun. 3, 2008, now Pat. No. 7,591,972, which is a division of application No. 10/711,206, filed on Sep. 1, 2004, now Pat. No. 7,381,041.

(51) Int. Cl.
  *B29C 45/14* (2006.01)
(52) U.S. Cl. .................... 264/279.1; 264/275; 264/334; 264/328.1; 264/297.2; 264/297.8
(58) Field of Classification Search ........................ None
  See application file for complete search history.

(56) References Cited

U.S. PATENT DOCUMENTS

| | | | |
|---|---|---|---|
| 0,721,462 | A | 2/1903 | Richards |
| 2,940,128 | A | 6/1960 | Howerman et al. |
| 3,034,791 | A | 5/1962 | Gallagher |
| 3,068,522 | A | 12/1962 | Nickerson et al. |
| 3,112,521 | A | 12/1963 | Ward |
| 3,130,102 | A | 4/1964 | Watson et al. |
| 3,147,324 | A | 9/1964 | Ward |
| 3,177,280 | A | 4/1965 | Ford et al. |
| 3,584,470 | A | 6/1971 | Zearfoss, Jr. |
| 3,616,101 | A | 10/1971 | Satchell et al. |
| 3,979,126 | A | 9/1976 | Dusbiber |
| 3,989,568 | A | 11/1976 | Isaac |
| 4,123,061 | A | 10/1978 | Dusbiber |
| 4,203,941 | A | 5/1980 | Brooker |
| 4,541,795 | A | 9/1985 | Cole |
| 4,959,000 | A | 9/1990 | Giza |
| 5,006,288 | A | 4/1991 | Rhodes, Jr. et al. |
| 5,006,297 | A | 4/1991 | Brown et al. |
| 5,112,556 | A | 5/1992 | Miller |
| 5,194,191 | A | 3/1993 | Nomura et al. |
| 5,334,673 | A | 8/1994 | Wu |
| 5,484,870 | A | 1/1996 | Wu |
| 5,692,974 | A | 12/1997 | Wu et al. |

(Continued)

*Primary Examiner*—Edmund H. Lee
(74) *Attorney, Agent, or Firm*—Michael A. Catania

(57) ABSTRACT

A method and assembly for molding golf balls is disclosed herein. The invention includes an injection mold assembly (20) with a first mold half (22a) having a plurality of cavities and at least one locating pin (92) and a second mold half (22b) having a plurality of cavities and at least one aperture for engagement with the at least one bushing (94) and a spring (250) for exerting a lateral force against the second mold half (22b). Preferably, the locating pin has a first taper section (93) and a second taper section (95). Preferably, the bushing (84) has a first cavity 1(115) and a second cavity (117).

6 Claims, 10 Drawing Sheets

U.S. PATENT DOCUMENTS

| | | |
|---|---|---|
| 5,703,193 A | 12/1997 | Rosenberg et al. |
| 5,733,428 A | 3/1998 | Calabria et al. |
| 5,885,172 A | 3/1999 | Hebert et al. |
| 5,888,437 A | 3/1999 | Calabria et al. |
| 5,897,884 A | 4/1999 | Calabria et al. |
| 5,908,358 A | 6/1999 | Wu |
| 5,947,843 A | 9/1999 | Calabria et al. |
| 6,328,921 B1 | 12/2001 | Marshall et al. |
| 6,499,983 B2 | 12/2002 | Marshall et al. |
| 6,503,073 B2 | 1/2003 | Marshall et al. |
| 6,932,931 B2 | 8/2005 | Murphy et al. |
| 7,381,041 B2 | 6/2008 | Wilber |

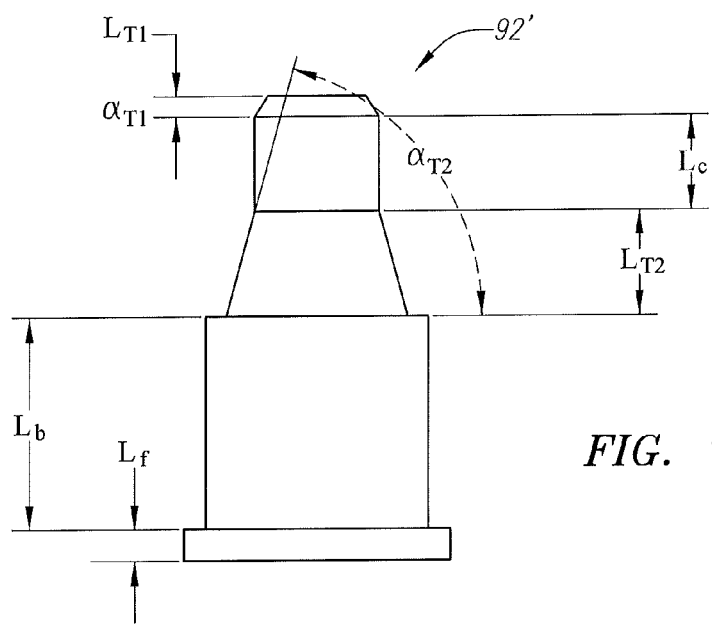
FIG. 7
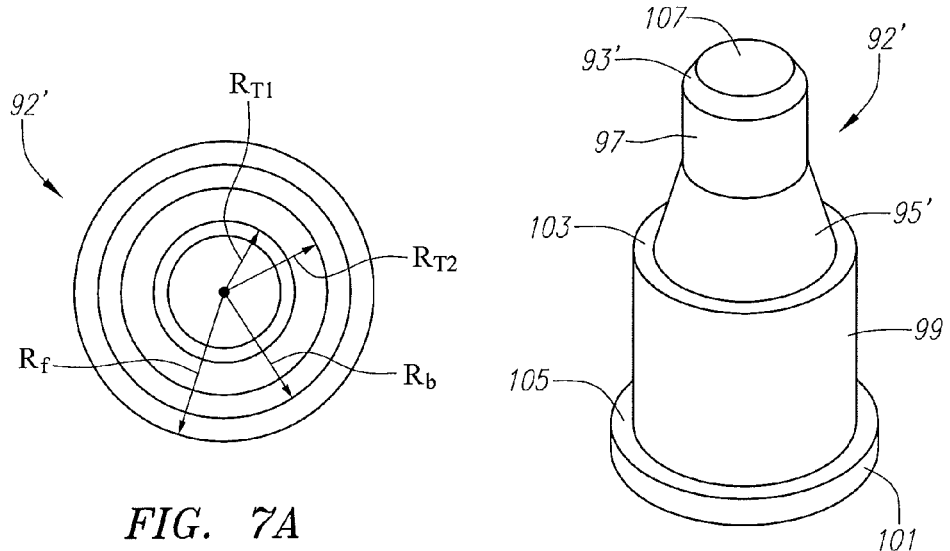
FIG. 7A
FIG. 7B

METHOD OF DE-MOLDING A PLURALITY OF GOLF BALLS OR GOLF BALL PRECURSOR PRODUCTS FROM INJECTION MOLD ASSEMBLY

CROSS REFERENCES TO RELATED APPLICATIONS

The Present application is a continuation of U.S. patent application Ser. No. 12/132,055, filed on Jun. 3, 2008 now U.S. Pat. No. 7,591,972, which is a divisional application of U.S. patent application Ser. No. 10/711,206, filed on Sep. 1, 2004, now U.S. Pat. No. 7,381,041.

STATEMENT REGARDING FEDERALLY SPONSORED RESEARCH OR DEVELOPMENT

Not Applicable

BACKGROUND OF THE INVENTION

1. Field of the Invention

The present invention relates to an apparatus and method for de-molding a golf ball from a mold cavity.

2. Description of the Related Art

Golf balls may comprise one-piece constructions or they may include several layers including a core, one or more intermediate layers and an outer cover that surrounds any intermediate layer and the core. In multi-component golf balls, there exists an inner core. Often, this core is made by winding a band of elastomeric material about a spherical elastomeric or liquid-filled center. Alternatively, the core may be a unitary spherical core made of a suitable solid elastomeric material. One such material that is conventionally used for the core of golf balls is a base rubber, such as polybutadiene, which is cross-linked with a metal acrylate, such as zinc diacrylate.

In the construction of some multi-component golf balls, an intermediate boundary layer is provided outside and surrounding the core. This intermediate boundary layer is thus disposed between the core and the outer cover of the golf ball.

Located outwardly of the core and any intermediate boundary layer is a cover. The cover is typically made from any number of thermoplastic or thermosetting materials, including thermoplastic resins such as ionomeric, polyester, polyetherester or polyetheramide resins; thermoplastic or thermoset polyurethanes; natural or synthetic rubbers such as balata (natural or synthetic) or polybutadiene; or some combination of the above.

The cover may be injection molded, compression molded, or cast over the core. Injection molding typically requires a mold having at least one pair of mold cavities, e.g., a first mold cavity and a second mold cavity, which mate to form a spherical recess. In addition, a mold may include more than one mold cavity pair.

In one exemplary injection molding process each mold cavity may also include retractable positioning pins to hold the core in the spherical center of the mold cavity pair. Once the core is positioned in the first mold cavity, the respective second mold cavity is mated to the first to close the mold. A cover material is then injected into the closed mold. The positioning pins are retracted while the cover material is flowable to allow the material to fill in any holes caused by the pins. When the material is at least partially cured, the covered core is removed from the mold.

As with injection molding, compression molds typically include multiple pairs of mold cavities, each pair comprising first and second mold cavities that mate to form a spherical recess.

Although the prior art has disclosed many methods of manufacturing golf balls, the prior art has failed to provide an efficient manufacturing process at a lower cost. The present invention overcomes the increased costs of the prior art by implementing an improved injection mold and de-molding process for a lower cost mass production process.

BRIEF SUMMARY OF THE INVENTION

One aspect of the present invention is an injection mold assembly for golf balls which includes a first mold half, a second half and a spring for exerting a lateral force against the second mold half during disengagement of the first mold half from the second mold half. The first mold half has a plurality of cavities and a first pin having a base with a first diameter and a first taper section with a diameter smaller than the first diameter. The second mold half has a plurality of cavities and a first bushing for engagement with the first pin of the first mold assembly. The first bushing has a main cavity with a first diameter and a first cavity with a diameter smaller than the diameter of the main cavity.

Another aspect of the present invention is a method for de-molding a plurality of golf balls or golf ball precursor products from an injection mold assembly. The method beings with injecting a polymer material into a plurality of cavities of a mold to form a layer for a golf ball. Next, a lateral force is exerted on the second mold half. Next, the first mold half is separated from the second mold half. Next, the second mold half is laterally displaced from the first mold half.

Having briefly described the present invention, the above and further objects, feature and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 7 is an isolated view of an alternative embodiment of a locating pin of the present invention.

FIG. 7A is top plan view of the locating pin of FIG. 7.

FIG. 7B is top perspective view of the locating pin of FIG. 7.

DETAILED DESCRIPTION OF THE INVENTION

Figure 1:
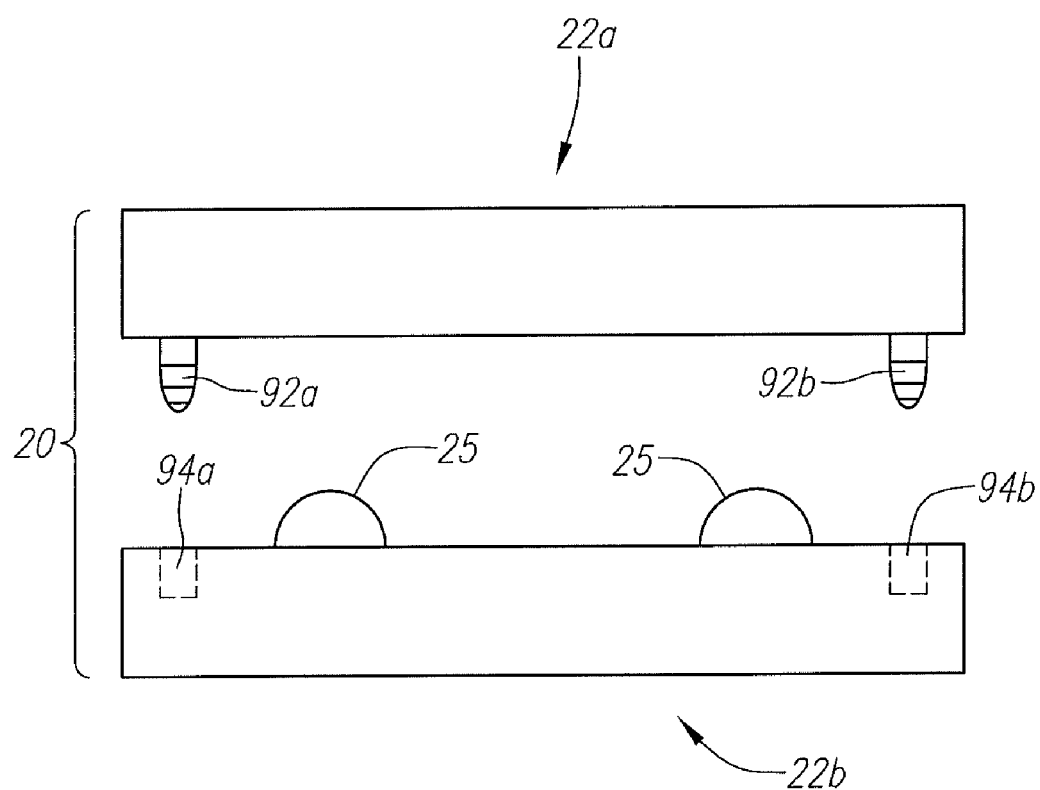
FIG. 1 is a side view of a mold assembly of the present invention
Figure 2:
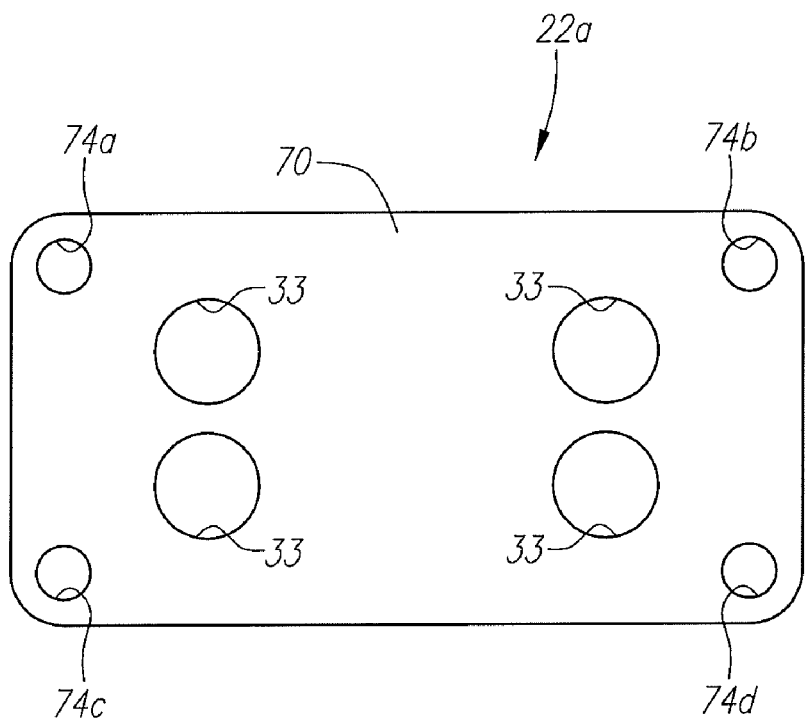
FIG. 2 is a top plan view of the first mold half of the mold assembly of FIG. 1.
Figure 3:
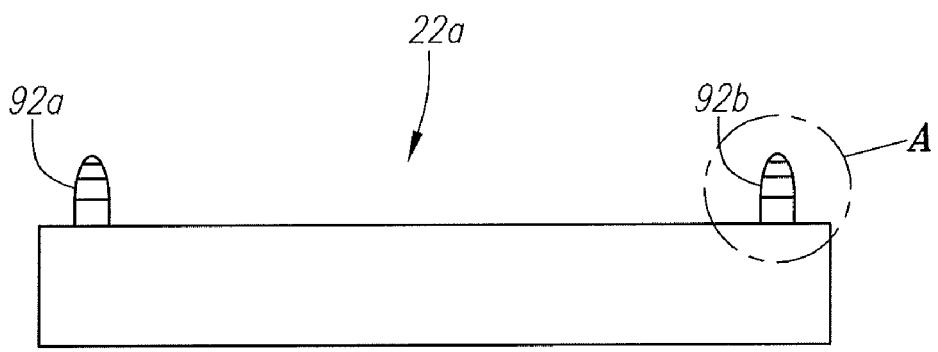
FIG. 3 is a side plan view of the first mold half of FIG. 2.
Figure 4:
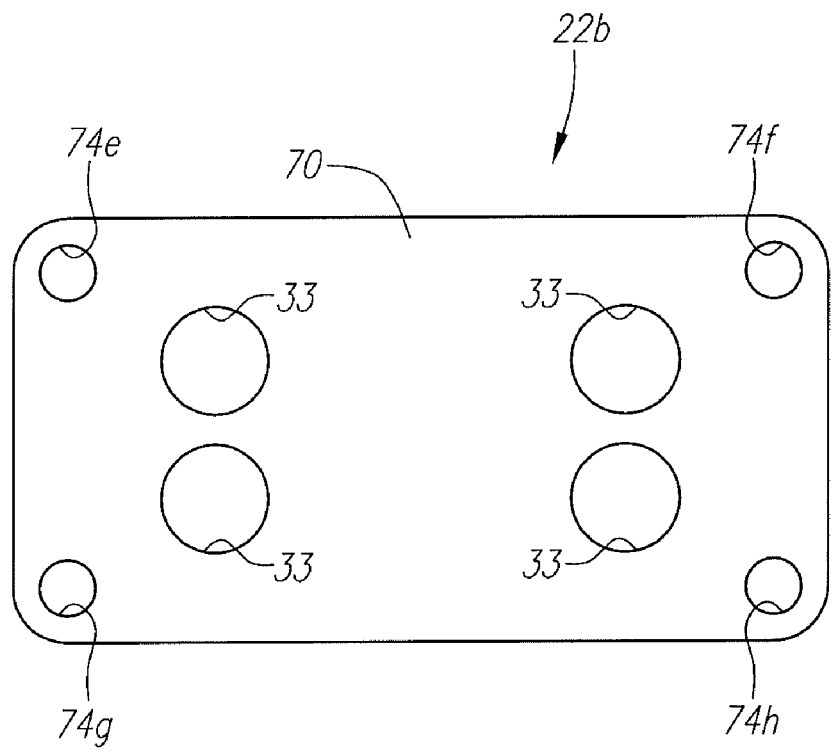
FIG. 4 is a top plan view of a second mold half of the mold assembly of FIG. 1.
Figure 5:
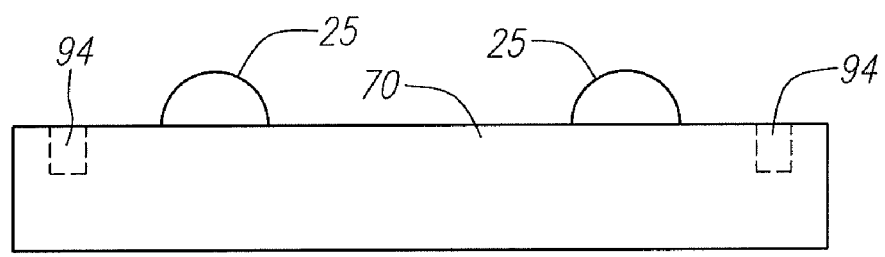
FIG. 5 is a side plan view of the second mold half of FIG. 4.

As shown in FIGS. 1-5, a mold assembly for injection molding a layer of a thermoplastic material on a golf ball precursor product is generally designated 20, and is composed of a first mold half 22a and a second mold half 22b. In a preferred embodiment, the first mold half 22a is the top mold half and the second mold half 22b is the bottom mold half. The mold halves 22a-b are mated together during the injection molding process.

Referring again to FIGS. 1-5, each mold half 22a-b is generally composed of a solid body 70. Each body 70 is preferably composed of a metal material, and most preferably composed of stainless steel. Each of the mold halves 22a-b preferably has a plurality of insert apertures 33 for preferably housing each of a plurality mold inserts 30. Preferably, the insert apertures 33 each have a diameter that ranges from 2.00 inches to 3.00 inches, and the diameter of each insert aperture is preferably larger than the diameter of the corresponding mold insert 30.

The first mold half 22a preferably has a plurality of locating apertures 74a-d at each corner. A plurality of locating pins 92a-b are preferably mounted within two of the plurality of locating apertures 74a-d. In a most preferred embodiment, locating pin 92a is mounted within locating aperture 74a and locating pin 92b is mounted within locating aperture 74d.

The second mold half 22b preferably has a plurality of locating apertures 74f-h at each corner. A plurality of locating bushings 94a-b are preferably mounted within two of the plurality of locating apertures 74f-h. In a most preferred embodiment, locating bushing 94a is mounted within locating aperture 74g and locating bushing 94b is mounted within locating aperture 74f.

The locating pins 92a-b and locating bushings 94a-b properly align the mold halves 22a-b during mating thereof to form the mold assembly 20. In a preferred embodiment, each of the plurality of locating pins 92a-b is diagonally opposed to each other on the first mold half 22a, and each of the plurality of locator bushings 94a-b is diagonally opposed to each other on the second mold half 22b.

Figure 6:
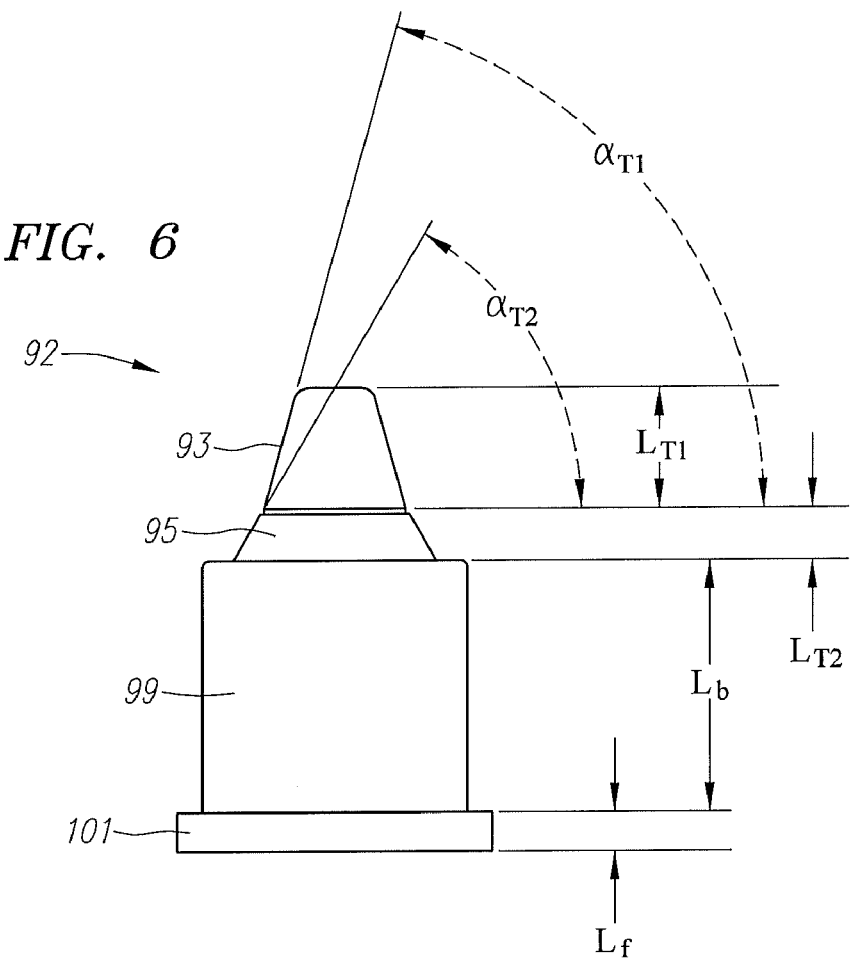
FIG. 6 is an isolated view of a preferred embodiment of a locating pin of the present invention.
Figure 6A:
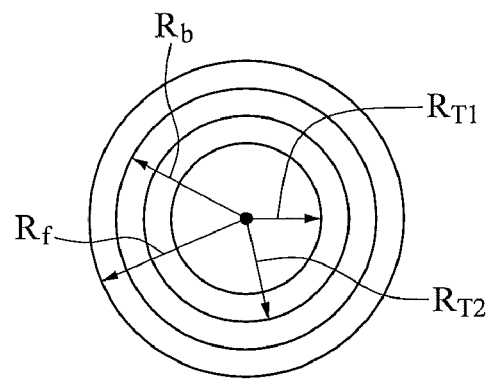
FIG. 6A is top plan view of the locating pin of FIG. 6.
Figure 6B:
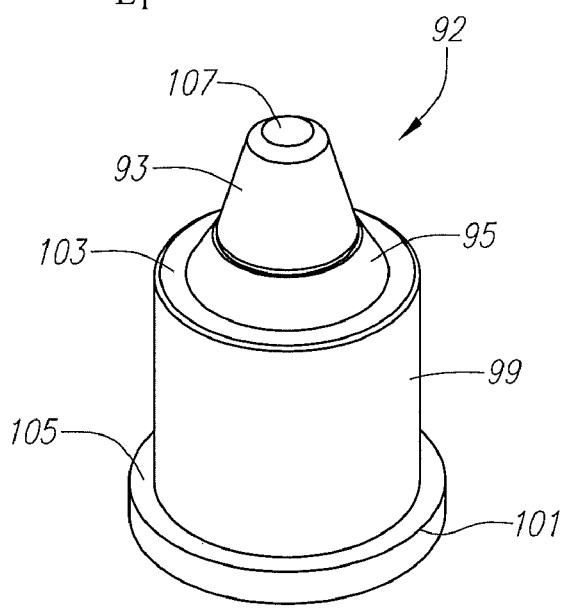
FIG. 6B is top perspective view of the locating pin of FIG. 6.

As shown in FIGS. 6, 6A and 6B, a preferred embodiment of the locating pin 92 has a first taper 93 section, a second taper section 95, a base 99 and a base flange 101. The locating pin 92 preferably has a flat top 107. The base flange 101 has a shoulder 105 to lock the locating pin within an aperture 74. The base 99 has a shoulder 103. The first taper section 93 is preferably tapered at an angle, $\alpha_{T1}$ ranging from 30 to 70 degrees relative to the shoulder 103 of base 99, and most preferably tapered at an angle of 45 degrees relative to the shoulder 103 of the base 99. The second taper section 95 is preferably tapered at an angle, $\alpha_{T2}$, ranging from 50 to 85 degrees relative to the shoulder 103 of base 99, and most preferably tapered at an angle of 75 degrees relative to the shoulder 103 of the base 99.

Each locating pin 92 has a length Lp preferably ranging from 1.5 inches to 4.0 inches, and most preferably a length of 2.3 inches. The base flange 101 has a length, "Lf", preferably ranging from 0.025 inch to 0.500 inch, and most preferably from 0.175 inch to 0.200 inch. The base 99 has a length, "Lb", preferably ranging from 0.75 inch to 2.0 inches, and most preferably a length of 1.25 inch. The second taper section 95 has a length, "$L_{T2}$", preferably ranging from 0.100 inch to 0.500 inch, and more preferably from 0.200 inch to 0.300 inch. The first taper section 93 has a length, "$L_{T1}$", preferably ranging from 0.250 inch to 1.00 inch, and most preferably from 0.500 inch to 0.750 inch.

As shown in FIG. 6A, the base flange 101 has a radius, "$R_F$", preferably ranging from 0.500 inch to 1.00 inch, and most preferably 0.75 inch to 0.90 inch. The base 99 has a radius, "$R_B$", preferably ranging from 0.400 inch to 0.95 inch, and most preferably 0.60 inch to 0.70 inch. The second taper section 95 has a radius, "$R_{T2}$", preferably ranging from 0.30 inch to 0.60 inch, and most preferably 0.35 inch to 0.50 inch. The second taper section 95 has a radius, "$R_{T2}$", preferably ranging from 0.30 inch to 0.60 inch, and most preferably 0.35 inch to 0.50 inch. $R_{T1}$ and $R_{T2}$, respectively, represent the largest radius of the first taper section 93 and the second taper section 95. The radius, if measured at other locations along each of the tapered section 93 and 95 will be smaller than $R_{T1}$ and $R_{T2}$.

In an alternative embodiment shown in FIGS. 7, 7A and 7B, the locating pin 92' has a cylindrical section 97 positioned between a first taper section 93' and a second taper section 95. In this embodiment, the locating pin 92 also has a base 99, a base flange 101, a flat top 107, a shoulder 105 and a shoulder 103. The first taper section 93' is preferably tapered at an angle, $\alpha_{T1}$, ranging from 30 to 70 degrees relative to the shoulder 103 of base 99, and most preferably tapered at an angle of 45 degrees relative to the shoulder 103 of the base 99. The second taper section 95' is preferably tapered at an angle, $\alpha_{T2}$, ranging from 50 to 85 degrees relative to the shoulder 103 of base 99, and most preferably tapered at an angle of 75 degrees relative to the shoulder 103 of the base 99.

Each locating pin 92' has a length Lp preferably ranging from 1.5 inches to 4.0 inches, and most preferably a length of 2.3 inches. The base flange 101 has a length, "Lf", preferably ranging from 0.025 inch to 0.500 inch, and most preferably from 0.175 inch to 0.200 inch. The base 99 has a length, "Lb", preferably ranging from 0.75 inch to 2.0 inches, and most preferably a length of 1.25 inch. The second taper section 95' has a length, "$L_{T2}$", preferably ranging from 0.250 inch to 0.750 inch, and more preferably from 0.550 inch to 0.650 inch. The cylindrical section 97 has a length, "Lc", preferably ranging from 0.400 inch to 1.0 inch, and most preferably a length ranging from 0.600 inch to 0.850 inch. The first taper section 93' has a length, "$L_{T1}$", preferably ranging from 0.080 inch to 0.150 inch, and most preferably from 0.100 inch to 0.130 inch.

As shown in FIG. 7A, the base flange 101 has a radius, "$R_F$", preferably ranging from 0.500 inch to 1.00 inch, and most preferably 0.75 inch to 0.90 inch. The base 99 has a radius, "$R_B$", preferably ranging from 0.400 inch to 0.95 inch, and most preferably 0.60 inch to 0.70 inch. The second taper section 95' has a radius, "$R_{T2}$", preferably ranging from 0.30 inch to 0.60 inch, and most preferably 0.35 inch to 0.50 inch. The second taper section 95 has a radius, "$R_{T2}$", preferably ranging from 0.30 inch to 0.60 inch, and most preferably 0.35 inch to 0.50 inch. $R_{T1}$ and $R_{T2}$, respectively, represent the largest radius of the first taper section 93' and the second taper section 95'. The radius, if measured at other locations along each of the tapered section 93' and 95' will be smaller than $R_{T1}$ and $R_{T2}$.

Figure 8:
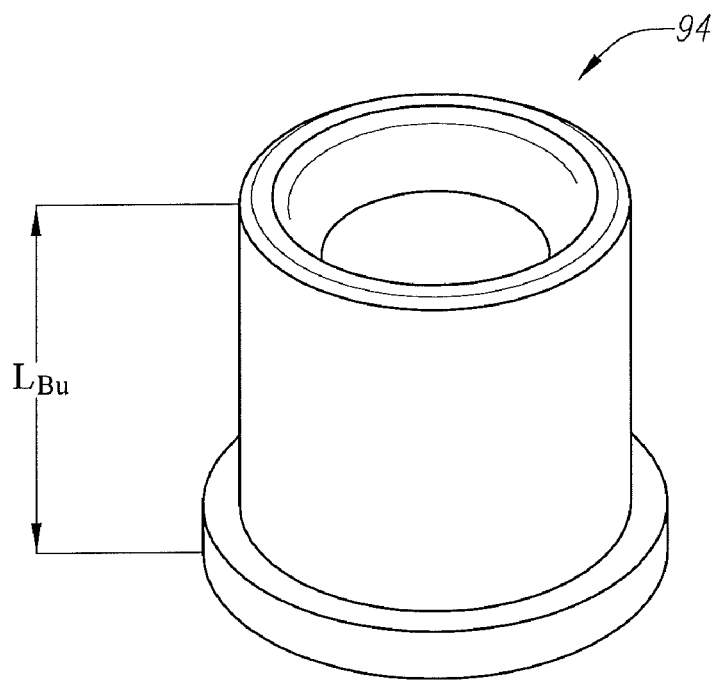
FIG. 8 is an isolated view of a bushing of the present invention.
Figure 8A:
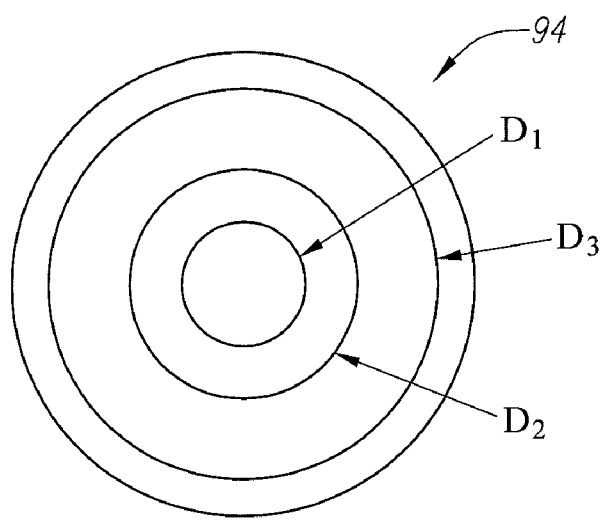
FIG. 8A is top plan view of the bushing of FIG. 8.

As shown in FIGS. 8 and 8A, a bushing 94 has a first diameter, "D1", a second diameter, "D2", and a third diameter "D3." The first diameter, D1, preferably has a diameter that ranges from 0.100 inch to 0.750 inch, and most preferably ranging from 0.350 inch to 0.500 inch. The second diameter, D2, preferably has a diameter that ranges from 1.0 inch to 1.750 inches, and most preferably ranging from 1.250 inches to 1.50 inches. The third diameter, D3, preferably has a diameter that ranges from 1.250 inches to 2.0 inches, and most preferably ranging from 1.50 inches to 1.750 inches. The bushing 94 preferably has a length Lbu, ranging from 1.0 inch to 2.0 inches, and most preferably from 1.25 inches to 1.50 inches.

Figure 9:
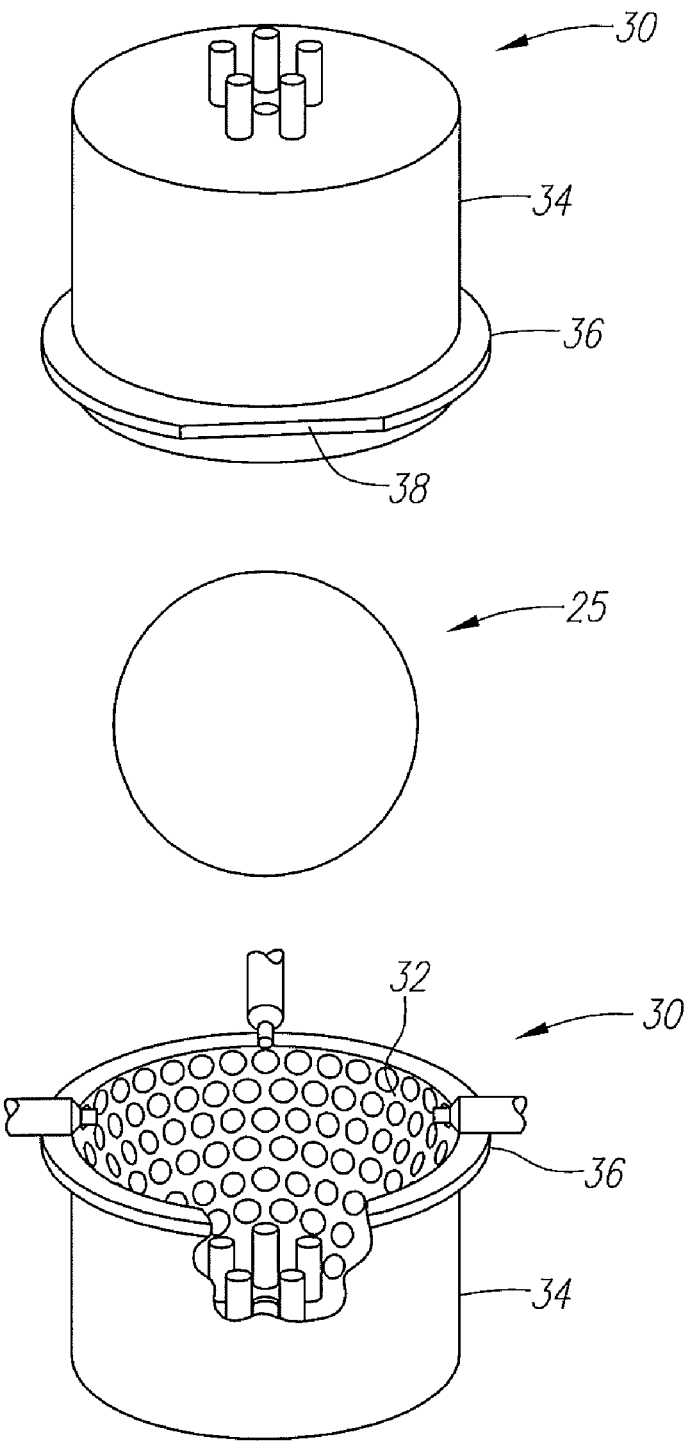
FIG. 9 is an exploded view of a pair mold inserts and golf ball precursor product utilized for the mold assembly of the present invention.

FIG. 9 illustrates a preferred pair of mold inserts 30 that are used with the mold assembly 20 of the present invention. Each mold insert 30 preferably has a hemispherical cavity 32 within a body 34. The body 34 preferably has an annular flange 36 that has an alignment flat 38 along a portion thereof. The flange 36 is preferably used for mounting each mold insert 30 within a mold half 22.

The hemispherical cavity 32 preferably has an inverse dimple pattern thereon if a cover is formed on the golf ball precursor product 25 in the mold insert 30. Alternatively, the hemispherical cavity 32 will have a smooth surface if a boundary layer is formed on the golf ball precursor product 25 in the mold insert 30. Support pins 28 are preferably configured to support the golf ball precursor product 25 in a predetermined position within a mold cavity. Each mold half 22a-b includes a series of gates and a network of feeder lines, not shown, for carrying the injectable material into the cavities of each of the mold inserts 30 during the manufacturing process.

Preferred injectable materials include thermoplastic and reaction injection moldable materials. Preferred thermoplastic materials include ionomers and polyurethanes. Preferred reaction injection moldable materials include polyurethanes such as disclosed in U.S. Pat. No. 6,699,027, which pertinent parts are hereby incorporated by reference.

Figure 10:
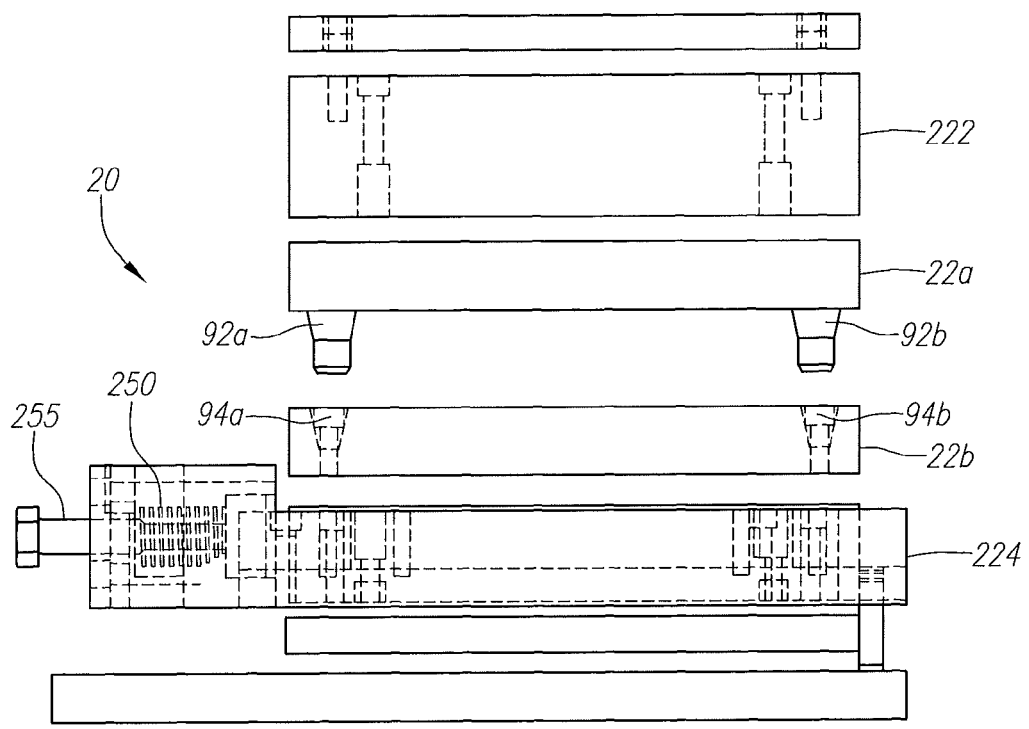
FIG. 10 is a side view of a mold assembly as utilized within an injection molding machine.
Figure 11:
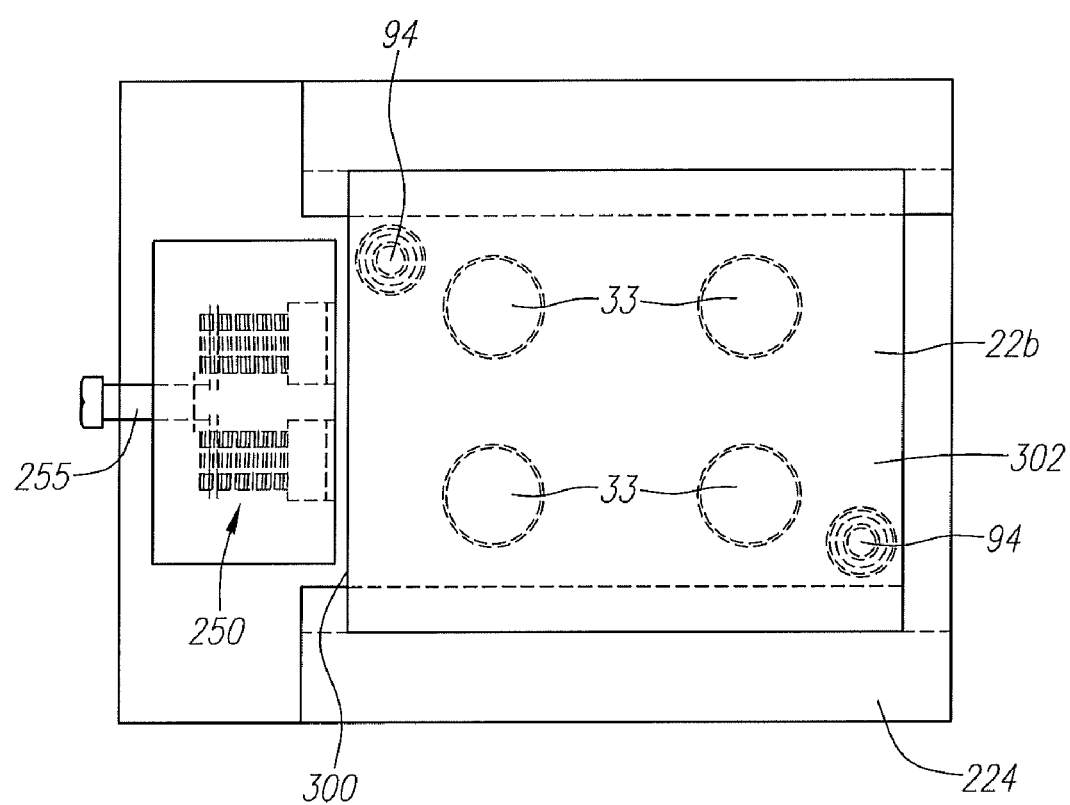
FIG. 11 is a top plan view of the second mold half and spring assembly of the present invention.

FIG. 10 illustrates the mold assembly 20 as utilized within an injection molding machine. The first mold half 22a is mounted to an upper frame 222 and the second mold half is mounted to a base 224. A spring assembly 250 exerts pressure on the second mold half 22a during the de-molding process as explained below. The pressure exerted by the spring is adjusted by an adjuster 255. FIG. 11 is a top plan view of the second mold half 22b within the base 224. The second mold half has a first end 300 and a second end 302, and the spring assembly 250 exerts pressure on a first end 300 of the second mold half 22b. In a preferred embodiment, the spring assembly exerts a pressure preferably ranging from 300 to 500 pounds per square inch. However, those skilled in the pertinent art will recognize that a greater or lesser pressure may be utilized without departing from the scope and spirit of the present invention.

Figure 12:
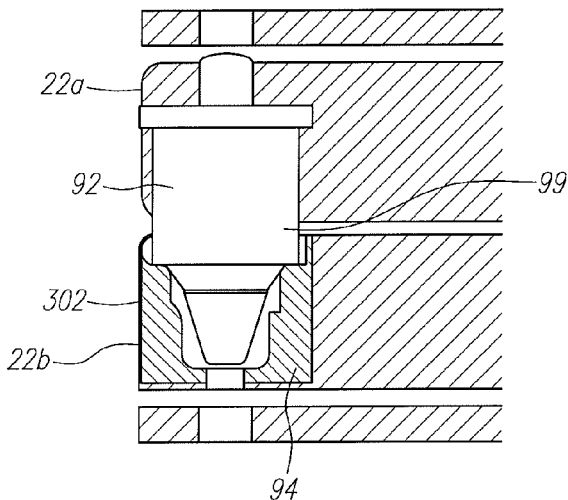
FIG. 12 is an isolated view of a locating pin within a bushing of the mold assembly of the present invention at the beginning of the separation of the first mold half from the second mold half during a de-molding process.
Figure 13:
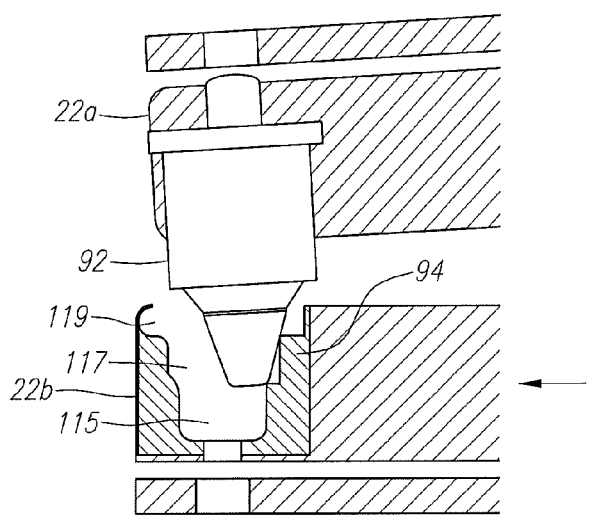
FIG. 13 is an isolated view of a locating pin within a bushing of the mold assembly of the present invention at an intermediate step of the separation of the first mold half from the second mold half during a de-molding process.
Figure 14:
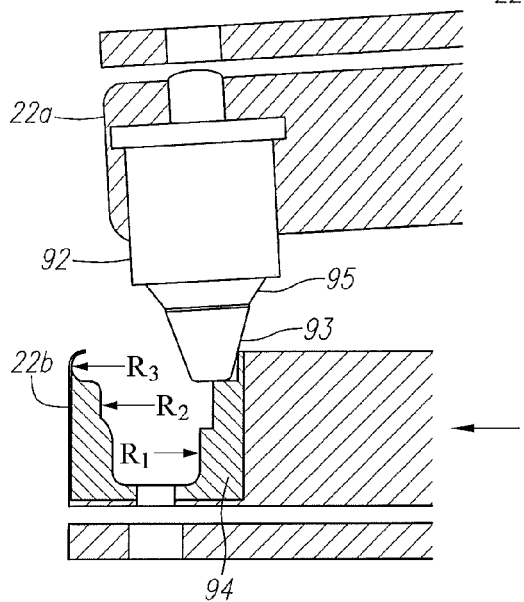
FIG. 14 is an isolated view of a locating pin within a bushing of the mold assembly of the present invention near the end of the separation of the first mold half from the second mold half during a de-molding process.

FIGS. 12-14 illustrate the operation of the locating pins 92 during the de-molding process. In FIG. 12, the locating pin 92 is completely within a bushing 94. The first taper section 93 within a first cavity 115 of the bushing 94, the second taper section 95 within a second cavity 117 of the bushing 94 and a portion of the base 99 is within a third cavity 119 of the bushing 94.

As shown in FIG. 13, the first mold half 22a further separates from the second mold half 22b, preferably vertically. During the separation, the spring assembly 250 exerts a constant lateral pressure on the second mold half 22b. As the locating pin 92 is separated from the bushing 94, the first taper section 93 and second taper section 95 allow for a relatively smooth transition with the first taper section 93 moving from the first cavity 115 to the second cavity 117 and the second taper section 95 moving from the second cavity 117 to the third cavity 119. During this separation, the second mold half 22b moves laterally in relation to the first mold half 22a. In a preferred embodiment, the lateral distance moved by the second mold half 22b relative to the first mold 22a is the radius R1, which is half the diameter, D1, of the first cavity 115 of the bushing 94. This preferred lateral movement a distance R1 occurs during the separation, preferably vertical separation, a distance $L_{T1}$, the length of the first taper section 93. The distance $L_{T1}$ preferably corresponds to the depth of the first cavity 115.

As shown in FIG. 14, the first mold half 22a further separates from the second mold half 22b, preferably vertically. Again, during the separation, the spring assembly 250 exerts a constant lateral pressure on the second mold half 22b. As the locating pin 92 is further separated from the bushing 94, the first taper section 93 allows for a relatively smooth transition with the first taper section 93 now moving from the second cavity 117 to the third cavity 119. During this separation, the second mold half 22b again moves laterally in relation to the first mold half 22a. In a preferred embodiment, the lateral distance moved by the second mold half 22b relative to the first mold 22a is the radius R2, half the diameter, D2, of the second cavity 117 minus R1. This preferred lateral movement a distance R2-R1 occurs during the separation, preferably vertical separation, a distance $L_{T2}$, the length of the second taper section 95. The distance $L_{T2}$ preferably corresponds to the depth of the second cavity 117.

Although not shown, as the locating pin 92 completely separates from the bushing 94, the second mold half 22b will laterally move due to the full extension of the spring assembly 255.

The present invention allows for an easier separation of the mod halves 22a-b during de-molding and also allows for a separation of the newly molded golf ball or golf ball precursor product from a hemispherical cavity of each of the mold inserts 30.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

I claim as my invention:

1. A method for de-molding a plurality of golf balls or golf ball precursor products from an injection mold assembly, the method comprising:

injecting a polymer material into a plurality of cavities of a mold to form a layer for a golf ball, the mold comprising a first mold half and a second mold half engaged together, the first mold half having a first pin comprising a base with a first radius, a first taper section with a second radius smaller than the first radius, a second taper section with a third radius smaller than the second radius, and the first mold half having a second pin having a base with a first radius, a first taper section with a second radius smaller than the first radius, and a second taper section with a third radius smaller than the second radius, the second mold half having a first bushing with a main cavity having a main cavity with a first diameter, a first cavity with a second diameter smaller than the first diameter of the main cavity, and a second cavity with a third diameter smaller than the second diameter, the first pin of the first mold half engaged within the first bushing of the second mold half, the second mold half having a second bushing for engagement with the second pin of the first mold assembly, the second bushing having a main cavity with a first diameter, a first cavity with a second diameter smaller than the first diameter of the main cavity, and a second cavity with a third diameter smaller than the second diameter;

exerting a lateral force on the second mold half by a spring assembly wherein the spring assembly exerts pressure on the second mold half ranging from 300 to 500 pounds per square inch;

separating the first mold half from the second mold half, wherein the first mold half is separated from the second mold half along a vertical axis; and forcing the second mold half to be laterally displaced from the first mold half along a horizontal axis perpendicular to the vertical axis.

2. The method according to claim 1 wherein injecting a polymer material comprises injecting a reaction injection polyurethane material.

3. The method according to claim 1 further comprising separating the first mold half from the second mold half a first vertical distance corresponding to a length of the second cavity and laterally moving the second mold half from the first mold half a first lateral distance.

4. The method according to claim 3 wherein the first lateral distance corresponds to the remainder of the second radius of the first cavity of the first bushing minus the third radius of the second cavity of the first bushing.

5. The method according to claim 3 further comprising separating the first mold half from the second mold half a second vertical distance corresponding to a length of the first cavity of the first bushing and laterally moving second mold half from the first mold half a second lateral distance.

6. The method according to claim 5 wherein the second lateral distance corresponds to the remainder of the first radius of the main cavity of the minus the second radius of the first cavity of the first bushing.

\* \* \* \* \*